United States Patent [19]

Freeman

[11] Patent Number: 4,561,624
[45] Date of Patent: Dec. 31, 1985

[54] MOUNTING PLATFORM
[75] Inventor: Frederick O. Freeman, Toledo, Ohio
[73] Assignee: Champion Spark Plug Company, Toledo, Ohio
[21] Appl. No.: 509,894
[22] Filed: Jun. 30, 1983
[51] Int. Cl.⁴ .............................................. F16M 3/00
[52] U.S. Cl. ................................... 248/639; 248/149; 474/114
[58] Field of Search ............... 248/639, 657, 658, 149, 248/558, 637; 474/114, 115, 26

[56] References Cited
U.S. PATENT DOCUMENTS

| 2,296,184 | 9/1942 | Riise ..................................... 248/639 |
| 2,414,975 | 1/1947 | Noble ................................... 248/639 |
| 2,762,663 | 9/1956 | Sloyan ................................. 248/657 |
| 2,833,597 | 5/1958 | Sloyan ................................. 248/657 |
| 3,064,486 | 11/1962 | Aplin ..................................... 474/26 |
| 3,753,542 | 8/1973 | Sloyan ................................. 474/114 |
| 4,344,598 | 8/1982 | Sloyan ................................. 248/657 |

Primary Examiner—William H. Schultz
Assistant Examiner—Ramon O. Ramirez
Attorney, Agent, or Firm—Oliver E. Todd, Jr.

[57] ABSTRACT

An improved platform (10) for mounting a motor (13) and a driven device (11) to facilitate adjusting tension on a drive belt 20. The motor (13) is mounted by means of bolts (14) which pass through a motor base (30) and slots (26 or 27) in the mounting platform (10) and engage openings (32) in a sub-plate (31). A screw (22) positions the sub-plate (31) to tension the belt (20). Two of the mounting platform slots 26 are offset relative to two other mounting platform slots 27 to maintain motor alignment as the belt tension is adjusted.

3 Claims, 3 Drawing Figures

MOUNTING PLATFORM

DESCRIPTION

1. Technical Field

This invention relates an improved mounting platform for a motor and a belt driven device such as a compressor and more particularly to an improved mounting for adjustably attaching the motor to the mounting platform for maintaining sheave alignment while the motor position is adjusted to adjust tension on a drive belt.

2. Background Art

Electric and gasoline motors are often connected through sheaves and a drive belt to a driven device such as a compressor or a generator, etc. The motor and the driven device are mounted on a platform in order to maintain tension on the drive belt and alignment between the motor output sheave and the input sheave to the driven device. Typically, the motor is mounted on the platform by bolts which pass through slots in the platform. In order to adjust tension on the drive belt, the motor mounting bolts are loosened, the motor is moved to a position to provide a desired belt tension and the bolts are tightened. As the motor is moved to increase tension on the belt, the forces tend to twist or rotate the motor relative to the mounting platform so that the motor output sheave is misaligned with the input sheave on the driven device. Twisting of the motor occurs due to clearances which must be provided between the motor mounting bolts, bolt holes in the motor base and the slots in the mounting platform. Misalignment between the output and input sheaves produces excessive wear on the drive belt and also may allow the belts to jump off of the sheaves. In order to eliminate misalignment problems between the output and input sheaves, special guides or belt tensioning devices have been used in the past. However, these add significantly to the cost of manufacturing a mounting platform and also often allow for misalignment due to human error. Special fixtures have been used for assuring alignment between the sheaves during assembly of the motor and driven device on the mounting platform. However, these fixtures are not normally available in the field and misalignment commonly occurs when a system operator adjusts the belt tension in the field.

DISCLOSURE OF INVENTION

In accordance with the present invention, a mounting platform is provided having fixed holes in which a driven device is mounted and two pairs of slots in which a motor is mounted for movement towards and away from the driven device in order to adjust tension on a drive belt. The motor base is provided with four holes or slots which align with the slots in the mounting platform and also align with threaded holes in a sub-plate located below the mounting platform. Bolts pass through each of the four holes in the motor base, the aligned slots in the mounting platform and threadably engage the sub-plate. A belt tensioning screw passes through an end flange on the mounting platform and also threadably engages an opening in an end flange on the sub-plate. When the motor mounting bolts are loosened and the adjustment screw is tightened, the sub-plate and the motor are moved relative to the mounting platform slots for increasing tension on the drive belt. The motor mounting bolts then are tightened to securely attach the motor to the mounting platform.

In order to facilitate assembly of the motor onto the mounting platform and to permit movement of the motor relative to the platform during belt tension adjustment, clearance is provided between the bolts and the sides of the holes through the motor base and the slots in the mounting platform. This clearance allows the motor to twist during belt tension adjustment due to the offset or moment between the force exerted by the taunt belt on the motor output sheave and the force exerted through the adjusting screw, the sub-plate and the mounting bolts. In accordance with the present invention, the two pairs of slots in the mounting platform are spaced apart in the direction in which the motor is moved and the slots in each pair are spaced transverse to the direction in which the motor is moved. The first slots are offset or located closer to the driven device than the second slots. The locations of the slots in the first pair are offset relative to the slots in the second pair in a direction transverse to the direction of the motor adjustment. The offset is equal to the sum of the clearances between any bolt and the sides of the motor base hole and the sides of the mounting platform slots.

When the motor position is adjusted to tension the drive belt, the twisting force maintains each motor mounting bolt passing through a slot in the first pair of slots in the mounting platform against the slot side furthest from the plane of the drive belt and maintains each bolt passing through a slot in the second pair of slots in the mounting platform against the sides of the slots closest to the plane of the drive belt. Each bolt contacts a side of the hole or slot in the motor base opposite to the side of the mounting platform slot contacted by such bolt. By offsetting the slots, alignment between the motor output sheave and the driven device input sheave is maintained during adjustment of belt tension. Also, alignment is maintained when belt tension is adjusted in the field without the use of special components or fixtures and there is no risk of misalignment due to human error.

BEST MODES FOR CARRYING OUT THE INVENTION

Figure 1:
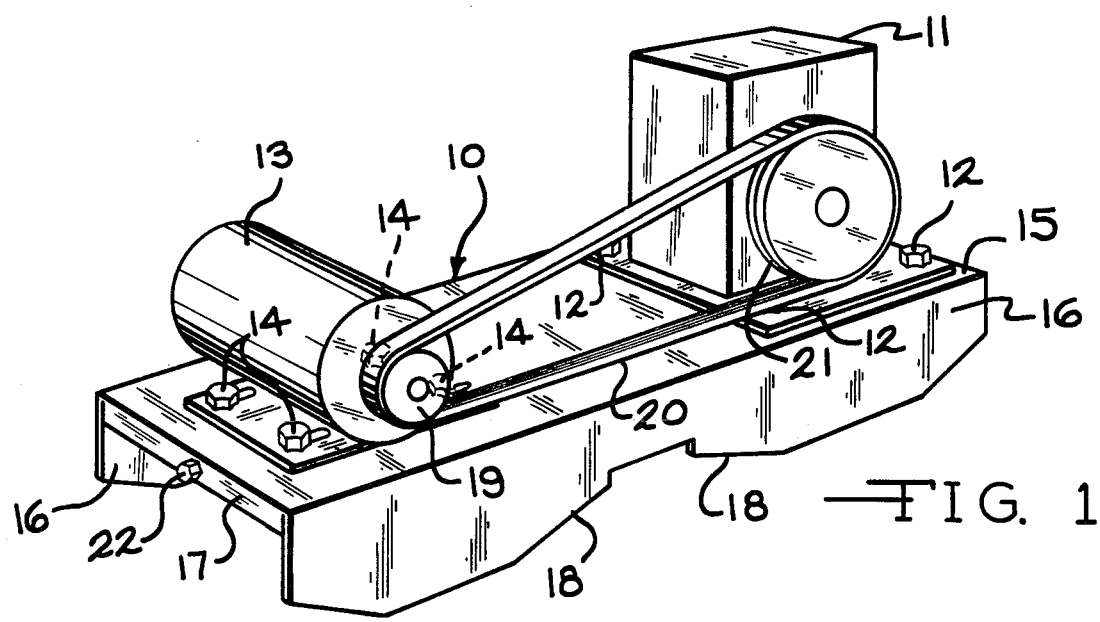
FIG. 1 is a perspective view of an assembly comprising a mounting platform in accordance with the present invention with an attached motor and driven device and a drive belt interconnecting the output sheave of the motor with the input sheave of the driven device.

Referring to the drawings and particularly to FIG. 1, an assembly is shown which comprises a mounting platform 10 having a driven device 11 such as a compressor or generator, etc., secured thereto by a plurality of bolts 12 and a motor 13 also secured thereto by four bolts 14. Although the motor 13 is illustrated as an electric motor, it will be appreciated that the motor 13 also may be an internal combustion engine.

The mounting platform 10 is generally U-shaped in cross section and has a flat upper surface 15, sides 16 and end flanges 17. Centers of the sides 16 may be provided with tapered portions 18 which facilitate welding the platform 10 to the rounded end of a vertical air receiving tank (not shown) when the driven device 11 is a compressor. The sides 16 also are adapted for welding to the upper edge of a horizontally oriented tank (not shown).

The motor 13 is provided with an output sheave 19 which is connected by a suitable drive belt 20 to an input sheave 21 on the driven device 11. Tension of the belt 20 is increased by loosening the motor mounting bolts 14, tightening an adjustment screw 22 which passes through the mounting platform end flange 17 to achieve a desired belt tension and then retightening the mounting bolts 14.

Figure 2:
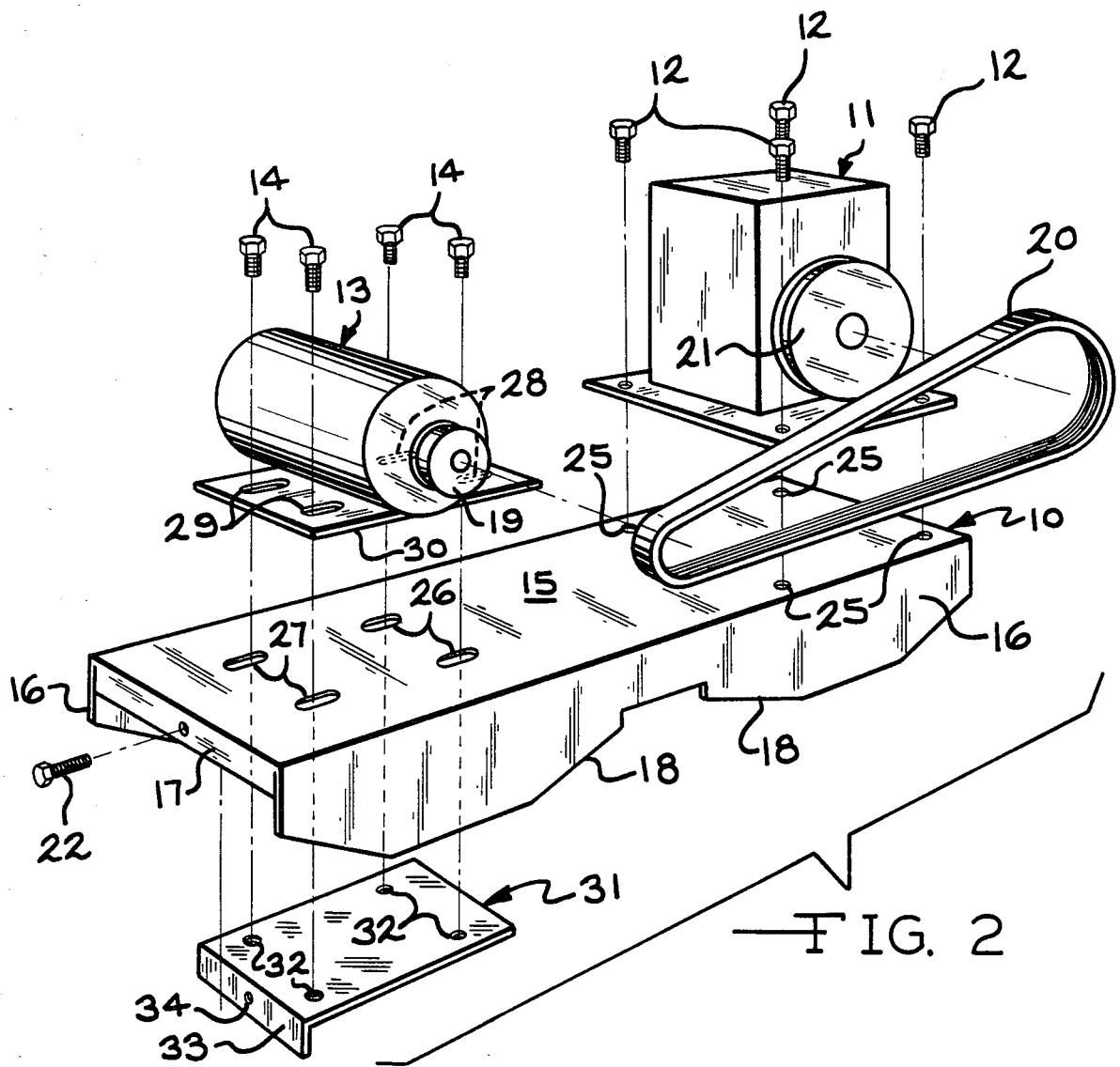
FIG. 2 is an exploded perspective view of the assembly of FIG. 1.

Referring to the exploded view of FIG. 2, additional details of the assembly are illustrated. The mounting platform 10 is provided with openings 25 through which the bolts 12 pass for mounting the driven device 11 on the platform 10. The platform openings 25 may be threaded or suitable nuts may be attached to the bolts 12 beneath the platform surface 15 for securing the driven device 11 to the platform 10. The platform 10 is also provided with a first pair of slots 26 and a second pair of slots 27 through which the motor mounting bolts 14 pass. The motor mounting bolts 14 also extend through first and second pairs of holes or slots 28 and 29, respectively, in a motor base 30. A sub-plate 31 is positioned below the mounting platform 10 and is provided with four threaded openings 32 for receiving the bolts 14. The sub-plate 31 also has an end flange 33 with a threaded opening 34 which receives the adjustment bolt 22. Thus, two of the bolts 14 pass through the motor base holes 28, the mounting platform slots 26 and engage two of the threaded openings 32 in the sub-plate 31 and the other two bolts 14 pass through the motor base holes 29, the mounting platform slots 27 and threadably engaged the other two sub-plate holes 32. When the bolts 14 are loosened and the adjustment screw 22 is tightened, the sub-plate flange 33 is pulled toward the mounting platform flange 17 and two of the bolts 14 engage ends of the slots 29 to draw the motor in a direction towards the mounting platform end flange 17 to tighten the belt 20.

Figure 3:
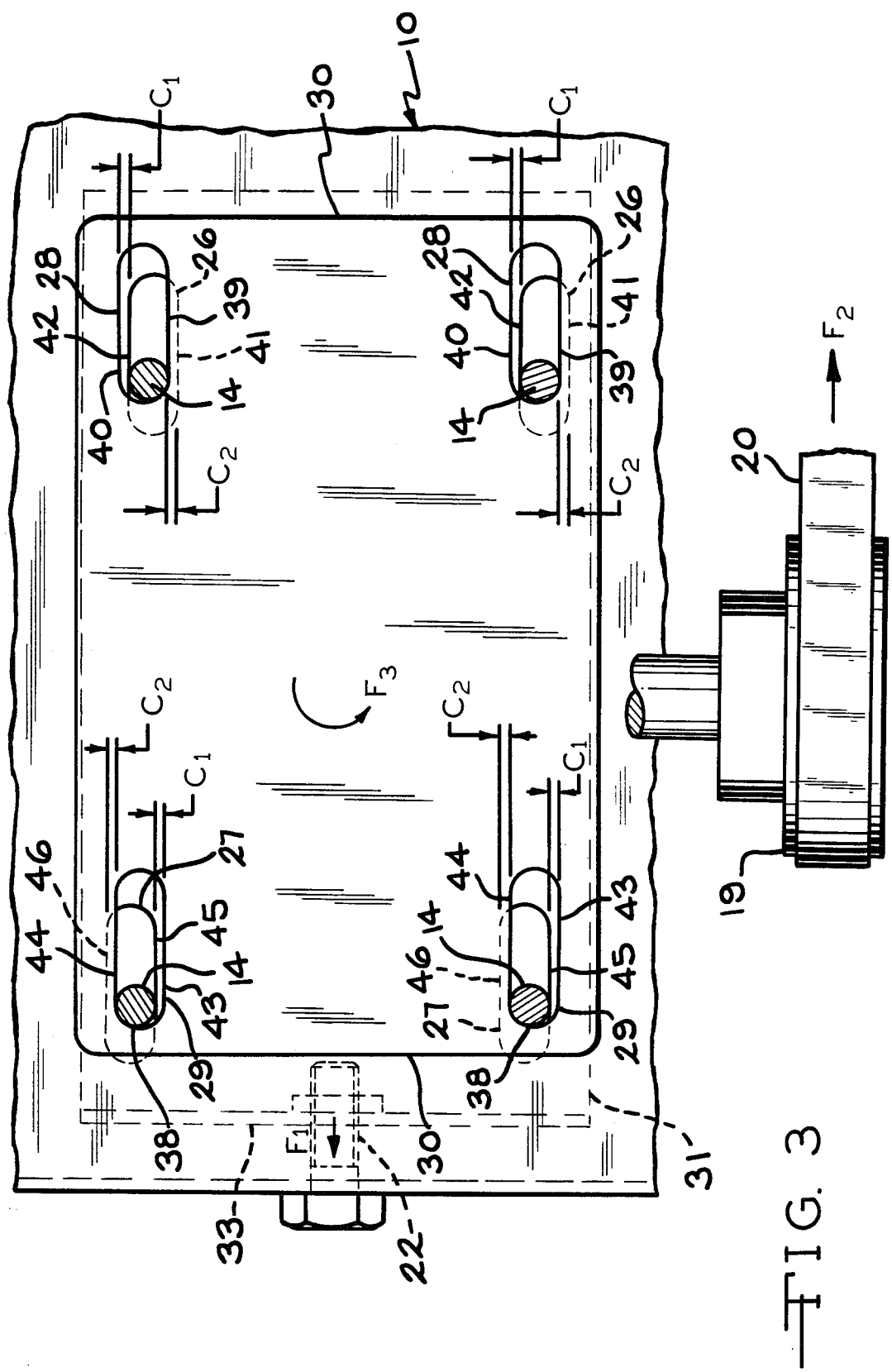
FIG. 3 is a fragmentary enlarged plan view showing the relationship of the motor mounting slots in the mounting platform.

Turning now to FIG. 3, a fragmentary plan view is provided showing the relationship between the slots 28 and 29 in the motor base 30, the slots 26 and 27 in the mounting platform 10 and the bolts 14 in accordance with the present invention. As the adjustment bolt 22 is tightened during belt tension adjustment to move the sub-plate 31 to the left, the two bolts 14 passing through the slots 27 move until they contact ends 38 of the holes or slots 29 in the motor base 30. When the sub-plate 31 is moved further, these bolts 14 move the motor base 30 to increase tension on the belt 20. It will be appreciated that as tension is increased, a force $F_1$ is transmitted through the bolts 14 to the motor base 30. At the same time, the belt 20 exerts an opposing force $F_2$ on the motor sheave 19. Since the forces $F_1$ and $F_2$ are offset, a moment or twisting force $F_3$ takes place on the motor 13 and its attached base 30 relative to the mounting platform 10.

The holes 28 and 29 in the motor base 30 may be round or they may be in the form of slots, as illustrated, to provide manufacturing tolerances to simplify assembly. All of the holes or slots 28 and 29 in the motor base 30 should have the same diameter or width. The two holes 28 should be spaced apart the same distance as the two slots 26 and the two holes 29 should be spaced apart the same distance as the slots 27. The slots 28 each have a side 39 spaced towards the plane of the drive belt 20 and a side 40 spaced further from the plane of the drive belt 20. The bolts 14 have a diameter smaller than the spacing between the slots side 39 and 40 to provide a clearance $C_1$. The slots 26 in the mounting platform 10 which are aligned with the holes or slots 28 also each have a side 41 located towards the plane of the drive belt 20 and a side 42 located away from the plane of the drive belt 20. Again, the bolts 14 are smaller in diameter than the spacing between the slot sides 41 and 42 to provide a clearance $C_2$. If the openings 26 are holes rather than slots, the clearance $C_2$ is the difference between the hole diameter and the bolt diameter.

Similar clearances are provided between the bolts 14 and the slots 29 in the motor base 30 and the slots 27 in the mounting platform 10. The slots 29 each have a side 43 located towards the plane of the drive belt 20 and a side 44 located further from the plane of the drive belt 20. A clearance $C_1$ is provided between the bolts 14 and the spaced slots sides 43 and 44. The slots 27 in the mounting platform 10 each have a side 45 spaced toward the plane of the drive belt 20 and a side 46 spaced further from the plane of the drive belt 20 and clearance $C_2$ is provided between the bolts 14 and the slot sides 45 and 46.

From studying the forces exerted on the motor and the motor base 30 shown in FIG. 3, it will be appreciated that the force $F_3$ tends to rotate the motor base 30 so that the sides 44 of the slots 29 contact the bolts 14 and the sides 45 of the slots 27 contact the bolts 14. At the opposite end of the motor base 30, the sides 39 of the slots 28 contact the bolts 14 and the sides 42 of the slots 26 contact the bolts 14. The forces $F_1$ and $F_2$ maintain these sides of the slots 26, 27, 28 and 29 in contact with the bolts 14 during adjustment of tension on the belt 20. If the slots 26 and 27 on one side of the mounting platform 10 are aligned and the slots 26 and 27 on the opposite side of the mounting platform 10 are aligned, the clearances $C_1$ and $C_2$ will allow the motor 13 to twist out of alignment during belt tension adjustment, unless special fixtures and extreme care are used. In accordance with the present invention, the slots 26 in the mounting platform 10 are offset relative to the slots 27 in a direction transverse to the direction in which the motor 13 is moved during belt tensioning. The offset is equal to the sum of the clearances $C_1$ and $C_2$ between the bolts 14 and the slots 26, 27, 28 and 29 and the offset is such that the slots 26 are located closer to the plane of the drive belt 20 than the slots 27. Since the force $F_3$ maintains sides of the slots in contact with the bolts 14 during adjustment, the offset assures that the sheave 19 will remain in the plane of the drive belt 20 during tensioning of the belt 20.

It will be appreciated that various changes and modifications may be made in the above described best mode of the invention without departing from the spirit and scope of the following claims. For example, the bolts 14 have been described as threadably engaging the holes 32 in the sub-plate 31. It will be understood that the bolts 14 may be passed upwardly through the mounting platform 10, passing through clearance openings in the sub-plate 31 and the mounting platform slot, and threadably engaging holes in the motor base 30. In the broadest aspect of the invention, it also will be understood that pairs of holes or slots 28 and 29 in the motor base 30 may be offset by the sum of the clearances $C_1$ and $C_2$ while the slots in the pairs of slots 26 and 27 are aligned.

Of course, it also will be appreciated that the motor 13 may be rigidly attached to the mounting platform 10 and the driven device 11 may be adjusted in a similar manner for tensioning the belt 20.

I claim:

1. An improved platform for mounting a motor having an output sheave and a driven device having an input sheave connected through a drive belt to the motor output sheave, said platform having means for securely mounting said driven device and first and second pairs of spaced slots to which said motor is mounted, said slots extending in parallel to each other and to the plane of said drive belt, said motor having a base with first and second pairs of holes spaced to align respectively with said first and second pairs of spaced slots, four bolts passing through aligned motor base holes and mounting platform slots, said bolts, when tightened, securely connecting said motor to said mounting platform and, when loosened, allowing said motor to move toward and away from said drive device for adjusting tension on said belt, characterized by a first clearance between said bolts and said motor base holes, a second clearance between said bolts and sides of said mounting platform slots, spacing the slots in said first pair of slots transverse to the direction of movement of said motor and locating said second pair of slots further from said driven device then said first pair of slots, spacing the slots in said second pair of slots transverse to the direction of movement of said motor and spacing said second slots closer to the plane of said drive belt than said first slots by a distance equal to the sum of said first and second clearances.

2. An improved mounting platform, as set forth in claim 1, and further characterized by the holes in at least one pair of the motor base holes having slot shapes, and wherein said first clearance is between said bolts and sides of said motor base slots.

3. An improved mounting platform, as set forth in claim 1, and further including a sub-plate having four threaded openings spaced for receiving ends of said bolts extending through said mounting platform slots, and means for moving said sub-plate when said bolts are loosened to adjust tension on the drive belt.

* * * * *